(12) United States Patent
Yang et al.

(10) Patent No.: US 8,411,727 B2
(45) Date of Patent: Apr. 2, 2013

(54) METHOD AND DEVICE FOR FEEDING BACK AND RECEIVING DOWNLINK CHANNEL INFORMATION

(75) Inventors: Luxi Yang, Shenzhen (CN); Daofeng Xu, Shenzhen (CN); Yongming Huang, Shenzhen (CN); Yi Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 867 days.

(21) Appl. No.: 12/429,409

(22) Filed: Apr. 24, 2009

(65) Prior Publication Data

US 2009/0262788 A1 Oct. 22, 2009

Related U.S. Application Data

(63) Continuation of application No. PCT/CN2007/002679, filed on Sep. 11, 2007.

(30) Foreign Application Priority Data

Oct. 24, 2006 (CN) .......................... 2006 1 0137285

(51) Int. Cl.
*H04B 1/00* (2006.01)
(52) U.S. Cl. ....................................... 375/146; 375/295
(58) Field of Classification Search .................. 375/146, 375/147, 260, 295, 299, 316
See application file for complete search history.

(56) References Cited

U.S. PATENT DOCUMENTS

| | | | |
|---|---|---|---|
| 6,735,180 B1 | 5/2004 | Malkamäki et al. | |
| 2003/0035469 A1 | 2/2003 | Frank et al. | |
| 2003/0112744 A1* | 6/2003 | Baum et al. | 370/206 |
| 2005/0164641 A1* | 7/2005 | Niwano | 455/67.11 |
| 2005/0254556 A1 | 11/2005 | Fuji et al. | |
| 2005/0286663 A1 | 12/2005 | Poon | |
| 2006/0165188 A1 | 7/2006 | Wunder et al. | |

(Continued)

FOREIGN PATENT DOCUMENTS

| | | |
|---|---|---|
| CN | 1482754 A | 3/2004 |
| CN | 1697361 A | 11/2005 |

(Continued)

OTHER PUBLICATIONS

3rd Generation Partnership Project (3GPP), "Technical specification group radio access network; multiple-input multiple output in UTRA," Technical Report TR 25.876, v1.8.0 (Oct. 2005).

(Continued)

*Primary Examiner* — Kabir A Timory
*Assistant Examiner* — David Huang
(74) *Attorney, Agent, or Firm* — Leydig, Voit & Mayer, Ltd.

(57) ABSTRACT

A method and a device for feeding back and receiving downlink channel information are disclosed, whereby spectrum utilization ratio of downlink channel information feedback is enhanced. According to the present invention, a wireless terminal superposes an uplink user information sequence with spectrum-spread downlink channel information before transmission. A network side de-spreads a received signal before estimating the downlink channel information, and then detects the user information sequence after subtracting the estimated downlink channel information from the received signal. An orthogonal code can be employed to spread the spectrum of the downlink channel information. The wireless terminal and base station use a plurality of antennas for transmission and reception.

7 Claims, 5 Drawing Sheets

U.S. PATENT DOCUMENTS

| | | | |
|---|---|---|---|
| 2006/0176803 | A1 | 8/2006 | Oh et al. |
| 2006/0182070 | A1 | 8/2006 | Pan et al. |
| 2007/0298728 | A1 | 12/2007 | Imamura et al. |

FOREIGN PATENT DOCUMENTS

| | | |
|---|---|---|
| CN | 1808962 A | 7/2006 |
| CN | 1812353 A | 8/2006 |
| CN | 101170316 B | 1/2011 |
| WO | WO 99/12282 A1 | 3/1999 |
| WO | WO 2004/008662 A1 | 1/2004 |
| WO | WO 2006/007148 A1 | 1/2006 |
| WO | WO 2006/028204 A1 | 3/2006 |

OTHER PUBLICATIONS

Written Opinion of the International Searching Authority in corresponding PCT Application No. PCT/CN2007/002679 (Dec. 13, 2007).

International Search Report in corresponding PCT Application No. PCT/CN2007/002679 (Dec. 13, 2007).

Extended European Search Report in corresponding European Application No. 07816305.2 (Oct. 20, 2009).

Marzetta et al., "Fast Transfer of Channel State Information in Wireless Systems," IEEE Transactions On Signal Processing, vol. 54, No. 4, Apr. 2006, Institute of Electronic and Electrical Engineers, Geneva, Switzerland.

Thomas et al., "Obtaining Channel Knowledge for Closed-Loop Multi-Stream Broadband MIMO-OFDM Communications Using Direct Channel Feedback," Motorola Labs—Communication Systems Research Laboratory, 2005, IEEE Globecom, Institute of Electronic and Electrical Engineers, Schaumburg, Illinois.

Foschini, "Layered Space-Time Architecture for Wireless Communication in a Fading Environment When Using Multi-Element Antennas," *Bell Labs Technical Journal*, 41-59 (Autumn 1996).

Golden et al., "Detection Algorithm and Initial Laboratory Results Using V-BLAST Space-Time Communication Architecture," *Electronics Letters*, 35(1) (Jan. 7, 1999).

\* cited by examiner

METHOD AND DEVICE FOR FEEDING BACK AND RECEIVING DOWNLINK CHANNEL INFORMATION

CROSS-REFERENCE TO RELATED APPLICATIONS

This application is a continuation of International Patent Application No. PCT/CN2007/02679, filed Sep. 11, 2007, which claims conventionality to Chinese Patent Application No. 200610137285.9, filed Oct. 24, 2006, both of which are hereby incorporated by reference in their entirety.

FIELD OF THE INVENTION

The present invention relates to the field of wireless communications, and more particularly to the technology of feeding back and receiving downlink channel information.

BACKGROUND

With the development and application of the Third Generation (3G) technology of mobile communications, it has become more and more important to get the downlink channel information at the transmitting end in a timely and precise manner, because currently available spectrum resources are becoming increasingly scarce.

Specifically speaking, in order to enhance utilization ratios of spectrums and power under the increasing scarcity of spectrum resources, it is necessary to pre-encode signals at the transmitting end for rational assignment to users of such resources as carriers, bits and power.

For a point-to-point single-user system, pre-encoding at the transmitting end may improve the Bit Error Rate (BER) performance of the system and simplify signal processing at the receiving side. For a downlink multi-user Space Division Multiple Access (SDMA) system, pre-encoding of signals at the transmitting end may effectively eliminate interferences among multiple users at the transmitting end completely or partially, thus reducing the load of signal processing at the receiving side and significantly enhancing downlink capacity of the system. As for an Orthogonal Frequency Division Multiple Access (OFDMA) system, rational assignment of carriers, bits and power may improve overall speed of the system and decrease transmit power.

In view of the above, in order to most possibly improve performance of the system from limited system resources such as limited time slot or limited frequency band, it is essential to meet the condition that the transmitting end can learn the downlink channel information precisely. As should be pointed out, most of the associated solutions in the 3G system employ the frequency division duplex (FDD) mode, and there is no reciprocity between uplink and downlink channels in the FDD mode.

Under such circumstances, it's necessary to establish an effective mechanism for feeding back downlink channel information (DL-CSI), so as to feedback the downlink channel information to the transmitting end in a timely and reliable manner.

Several conventional mechanisms for feeding back channel information, as well as defects inherent therein, are presented below.

The first one is a codebook mechanism for feeding back channel information by constructing a codebook, where the channel information is detected at the receiving side and then vector-quantized to search for the codebook to obtain a codebook number, and the codebook number is fed back to the transmitting end. Although this mode reduces the amount of feedback, its defects rest in greatly reducing feedback precision and increasing processing complexity of the receiving side.

The second one is a channel quality indicator (CQI) mechanism for feeding back channel information, where channel information is detected at the receiving side, a proper Modulation and Coding Scheme (MCS) is selected according to the channel information, and the CQI value is fed back to the transmission terminal. Subsequently, the transmitting end adjusts the MCS according to the CQI value. Although this mode likewise reduces the amount of feedback, it still contains the defects such as low feedback precision, merely coarse description of channel quality, and incapability of reflecting specifics of the channel information.

The third one is a vector-quantization plus coding method of Direct Channel Information Feedback (DCFB), where channel information is sent, either directly or after having been vector-quantized and coded, to the transmitting end. Like all those in the current methods for feeding back channel information, defect of this mode lies in its separate occupation on a certain time slot or frequency band, thus leading to occupation on valuable uplink system resources.

In short, defects commonly existed in all currently available methods for feeding back channel information lie in the necessity of separate occupation on a certain time slot or frequency band, and such occupation consumes valuable uplink system resources and hence cost in feedback is relatively high. Although the first and second methods as discussed above can reduce consumption of system resources through reduction of the amount of feedback, they are nonetheless insufficient in precision.

SUMMARY

The principal technical problem to be solved by various embodiments of the present invention is to provide a method or a device for feeding back or receiving downlink channel information.

In order to solve this technical problem, the present invention provides an embodiment of a method for feeding back downlink channel information. The embodiment of the method includes: spreading, by a wireless terminal, spectrum of the downlink channel information; and transmitting to a network side the spectrum-spread downlink channel information after having been superposed to a user information sequence of a current user terminal, or transmitting to the network side the spectrum-spread downlink channel information through wireless resource used by another wireless terminals to transmit its user information sequences.

The present invention further proposes an embodiment of a method for receiving downlink channel information. The embodiment of the method includes: de-spreading a received signal at a network side, and estimating the downlink channel information of each wireless terminal according to the de-spread signal; and after subtracting the estimated downlink channel information from the received signal, detecting user information to obtain a user information sequence.

The present invention further provides an embodiment of a wireless terminal, which includes: a unit adapted to spread spectrum of downlink channel information; a unit adapted to superpose the spectrum-spread downlink channel information on a user information sequence; and a unit adapted to transmit the superposed signal to a network side.

The present invention further provides an embodiment of a network-side device, which includes: a de-spreading unit adapted to de-spread a received signal; an estimating unit adapted to estimate downlink channel information of each wireless terminal; an interference counteracting unit adapted to subtract the estimated downlink channel information from the received signal; and a detecting unit adapted to detect user information from the received signal after subtracting the estimated downlink channel information.

As can be found through comparison, the technical solution of the present invention differs from the conventional art mainly in the fact that the wireless terminal performs transmission after superposing the uplink user information sequence on the spectrum-spread downlink channel information. Because feedback of the downlink channel information does not separately occupy wireless resources, spectrum utilization ratio of the claimed system is higher than those of all currently available methods for feeding back channel information.

It is also possible to transmit to the network side the spectrum-spread downlink channel information by means of wireless resource that is used by another wireless terminal to transmit its user information sequence. Because the same void resources are occupied, the downlink channel information transmitted by a plurality of wireless terminals will be superposed on the user information sequence of a wireless terminal in space. Such solution pertains to the same inventive concept as superposition of the user information sequence and the downlink channel information in a single wireless terminal, and the two solutions differ from each other in terms of positions of superposition and in terms of belongings of the user information sequence and the downlink channel information. Because the downlink channel information and the user information sequence share the same wireless resources, the spectrum utilization ratio is relatively high, and because of the relatively high spectrum utilization ratio, the amount of downlink channel information allowed for transmission is also relatively large, thereby enhancing feedback precision.

Because the orthogonal code is used to spread the spectrum of the downlink channel information, it is possible to estimate the downlink channel information at the network side more precisely.

Estimation precision of the downlink channel information can be adjusted through assignment of the relative transmit powers of the user information sequence and the downlink channel information. The ratio of the downlink channel information in the total transmit power suffices by being adequately added a little on the basis of assuring the requirement on bit error rate at the receiving side.

The wireless terminal and the base station use a plurality of antennas for transmission and reception, and it is possible to enhance receiving gain by using spatial diversity.

Because the information amount of the downlink channel information under an MIMO system is relatively large, enhancement effect of the spectrum utilization ratio will be more remarkable when the present invention is applied to the MIMO system.

At the network side the downlink channel information is estimated after the received signal is de-spread, and the user information sequence is detected after the estimated downlink channel information is subtracted from the received signal. Because the downlink channel information is performed with spectrum spreading, especially orthogonal spectrum spreading, there is additional spectrum spread coding gain, thus making it possible to precisely estimate the downlink channel information. Subtraction of the estimated downlink channel information before detection of the user information sequence enables enhancement of precision in detecting the user information sequence.

The user information sequence obtained through detection is subtracted from the received signal, the signal as obtained is de-spread again, and the downlink channel information of each wireless terminal is re-estimated according to the de-spread signal. Subsequently, the re-estimated downlink channel information is again subtracted from the received signal, and the signal as obtained is again performed with user information detection to obtain each user information sequence. The process of iteration is thus repeated until convergence, thus making it possible to further enhance precision of the downlink channel information and the user information sequence.

DETAILED DESCRIPTION OF THE INVENTION

To make the objectives, technical solutions and advantageous effects of the present invention more clearly, the invention is described below in great detail with reference to drawings.

According to an embodiment of the present invention, the transmitting device includes: (1) a serial-to-parallel converter, adapted to perform serial-to-parallel conversion to an uplink user information sequence to obtain a block signal having a predetermined length; (2) a plurality of spectrum spreading units, each spectrum spreading unit corresponding to one downlink channel information; (3) a superposing means, adapted to superpose the uplink user information sequence to the spectrum-spread downlink channel information; and (4) a parallel-to-serial converter, adapted to perform parallel-to-serial conversion on the superposed signal to transmit.

One uplink user information sequence block having a predetermined length at the transmitting side can be expressed as follows:

$$S_T(i)=[s(iT+1)s(iT+2)\ldots s(iT+T)]$$

where $S_T(i)$ is one user information sequence block, i is the serial number of the block obtained through serial-to-parallel conversion, T is the length of the block, and s(n) indicates the $n^{th}$ information character.

The uploaded downlink channel information can be expressed as follows: suppose that the downlink channel information need to be uploaded by one user can be expressed as $h=[h_1 h_2 \ldots h_K]$ where $h_K$ is Kth scalar downlink channel information associated with the user, and that the downlink channel information is processed with spectrum spreading according to the following equations:

$$P=[p_1 p_2 \ldots p_K], \tilde{h}=hP^T$$

where P indicates T×K dimension spectrum-spreading matrix, each column vector $p_k$ indicates a Walsh spectrum-spreading code having a length of T, and satisfies $p_j^T p_k = T\delta(j-k)$, $\tilde{h}$ indicates the downlink channel information performed with spectrum spreading, and $(\cdot)^T$ indicates transposition.

The signal actually transmitted by a certain user can be expressed as follows:

$$X_T(i) = \sqrt{(1-\rho)E_x}\, S_T(i) + \sqrt{\frac{\rho E_x}{K}}\, hP^T$$

where $X_T(i)$ indicates the signal actually transmitted, $\rho$ indicates the percentage of the downlink channel information in the power of the total transmission signal, and $E_x$ indicates the total transmit power. The spectrum-spreading matrices assigned to different users satisfy orthogonality.

In one embodiment of the present invention, the transmitting method is: first performing serial-to-parallel conversion on the uplink user information sequence to obtain a block signal having a predetermined length, while at the same time performing spectrum spreading on the downlink channel information in which spectrum-spreading vectors to which different channel information correspond satisfy orthogonality, and then superposing the uplink user information serial signal and the spectrum-spread signal of the downlink channel information according to predetermined power assignment. Finally the superposed output is performed with parallel-to-serial conversion and transmitted by the transmission antenna.

The receiving device according to an embodiment of the present invention includes: (1) a plurality of downlink channel information estimators, adapted to estimate downlink channel information of a plurality of users; and (2) a signal detector, adapted to detect uplink information sequences of the plurality of users.

Each downlink channel information estimator further includes: (1) a plurality of de-spreaders each corresponding to one user, adapted to de-spread a received signal and extract downlink channel information corresponding to each user; and (2) a plurality of minimum mean square error downlink channel information estimators, adapted to estimate downlink channel information vector corresponding to each user.

The signal detector further includes: a downlink channel information interference counteracter, adapted to eliminate influence of the downlink channel information uploaded by each user on the performance of each user information sequence detection; and a receiver, adapted to detect information sequence uploaded by each user.

In one embodiment of the present invention, the receiving method is: multiplying the received multiple signals with the spectrum-spreading matrix assigned to each user to obtain the de-spread signal of each user; estimating the downlink channel information of each user using the de-spread signal by, for example, minimum mean square error estimation; after obtaining the downlink channel information, subtracting the contribution of the downlink channel information to the received signal from the received signal to eliminate interference to the uplink information sequence; detecting the information obtained by the subtracting to obtain the estimation of each user information sequence. Contribution to the received signal is subtracted from the received signal by using the estimated user information sequence to eliminate interference to the downlink channel information, and the next round of estimation of the downlink channel information is performed again. The process of iteration is thus repeated to finally obtain estimated values of the downlink channel information and the user information sequence. The number of iteration is 2 to 3 times. The minimum mean square error estimation is a conventional art technique, and please refer to relevant publication documents for specifics.

The method of detecting the uplink user signal includes: detecting an output signal with the least mean square error; subtracting contribution of this output signal to an input signal from the input signal to eliminate interference; detecting another remaining output signal with the least mean square error, and subtracting contribution of this output signal to a received signal from the received signal to eliminate interference, until uplink information sequences of all users have been detected.

The present invention is applicable to the circumstance in which the wireless terminal has a plurality of antennas. According to the requirements of the system on diversity degree and speed, the uplink can be transmitted in the form of space division multiplexing or space-time block coding. Suppose the number of antennas of the wireless terminal is N, regarding the transmission mode using space division multiplexing, its effect is equivalent to the circumstance of U×N single-antenna wireless terminals, where U is the wireless terminal; regarding the transmission mode using space-time block coding, its effect is similar with the circumstance of U single-antenna wireless terminals, but differs therefrom only in the presence of an extra transmission diversity.

The present invention is applicable to wideband wireless communications where channels are frequency-selective. In this case, the user information sequence and the downlink channel information can be superposed and transmitted on each subcarrier of an Orthogonal Frequency Division Multiplexing (OFDM) system, and it is also possible to make use of the correlation of frequency response of the downlink channel on each carrier to further enhance estimation precision of the downlink channel information.

One embodiment of the present invention provides a multi-user multiplexing mode of SDMA, in which case data of each user occupies the same time and band, and estimation and detection of data of different users depend on differences among the spatial channels of each user and are differentiated through the receiving antenna array of the base station. The present invention can also be easily applied to the OFDMA mode, in which case each user uniquely occupies certain frequency points, and it is possible to upload the information sequence and channel information associated with the user on these frequency points, with the effect thereof being equivalent to that of a single-user system.

An example is given below for feeding back downlink channel information of a multi-user wireless communications system, where the uplink user information sequence and the downlink channel information are superposed for transmission. Because feedback of the downlink channel information does not exclusively occupy system resources, spectrum utilization ratio of the system is higher than those of all currently available methods for feeding back channel information.

Figure 1:
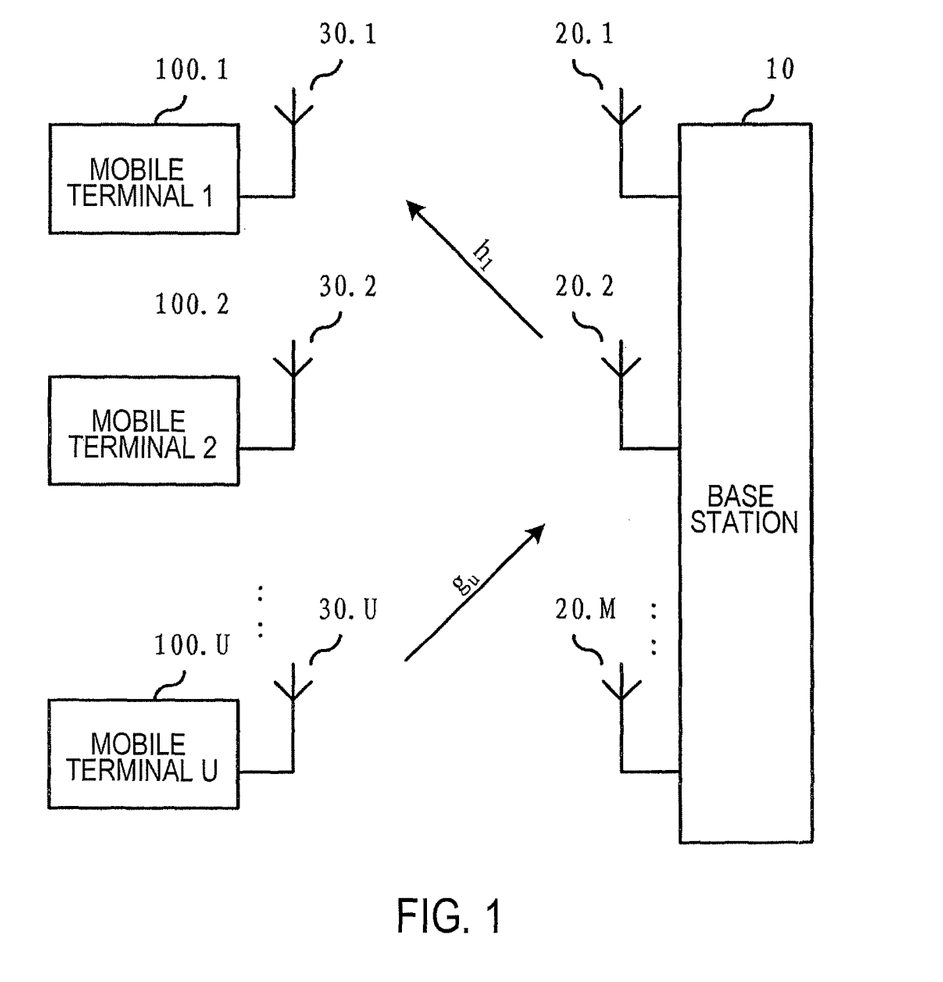
FIG. 1 is a schematic view showing uplink and downlink channels in a multi-user wireless communications system according to an embodiment of the present invention.

FIG. 1 illustrates a schematic view showing uplink and downlink channels in a multi-user wireless communications system. The base station 10 makes use of antenna array 20 of M units to perform signal transmission and reception, and U mobile users 100.1-100.U make use of single-antennas 30.1-30.U for transmission and reception. The uplink channel from user u to the base station is indicated by vector $g_u$, and the downlink channel from the base station to user u is indicated by $h_u$. Although in the system shown in FIG. 1 only the circumstance in which the mobile terminal makes use of single-antennas for transmission and reception is taken into consideration, the present invention can also be conveniently applied to the circumstance in which the mobile terminal has a plurality of antennas. In that case, according to the requirement on the speed and diversity degree, uplink data can be uploaded in the form of Space Division Multiplexing (SDM) or Space Time Coding (STC), while the downlink channel information can still be superposed in the same manner as the single-antenna.

Figure 2:
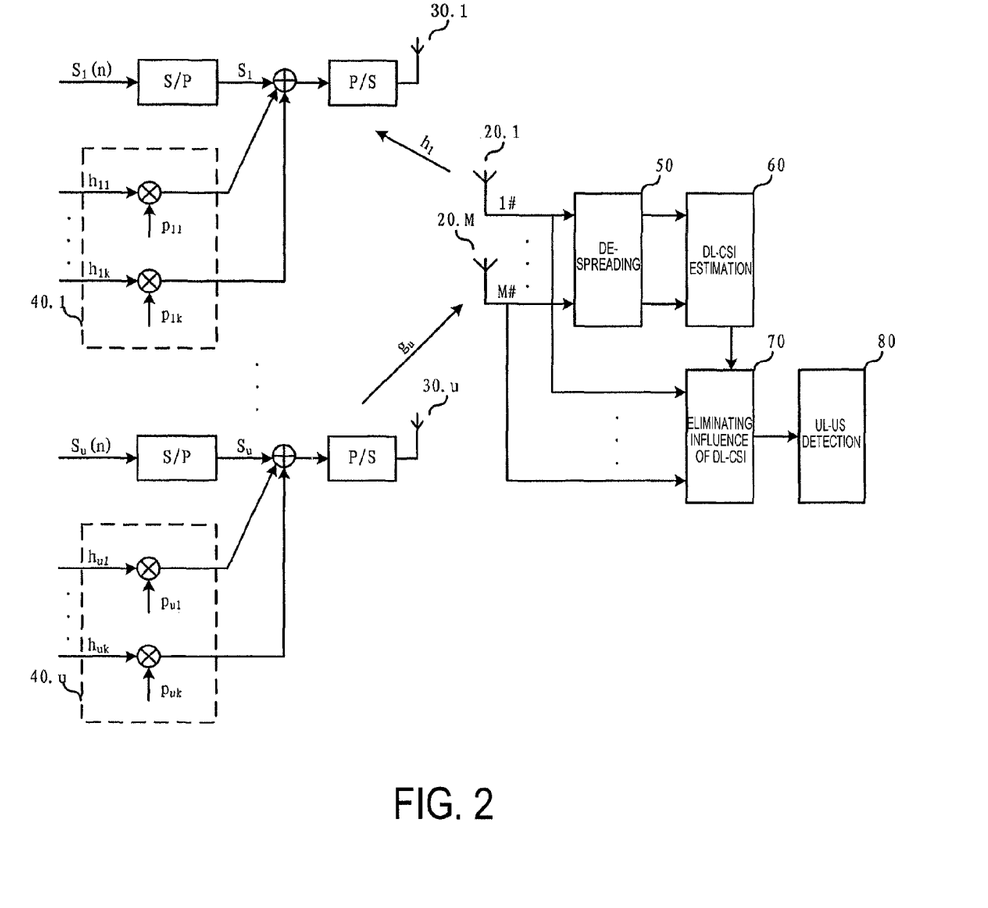
FIG. 2 is a schematic structural view showing uplink transmitting/receiving devices in a multi-user wireless communications system according to an embodiment of the present invention.

FIG. 2 is a schematic structural view showing uplink transmitting/receiving devices in a multi-user wireless communications system according to an embodiment of the present invention. User u superposes its own uplink information sequence on downlink channel information and transmits the same. Suppose the serial information sequence of user u is $s_u(n)$, which satisfies independent and identical distribution (i.i.d.) characteristics and has unit power. It is performed with serial-to-parallel conversion to form an uplink user information sequence having a length of T:

$$S_u(i) = [s_u(iT+1) s_u(iT+2) \ldots s_u(iT+T)] \quad (1)$$

where $S_u(i)$ is an information sequence block of user u, i is the serial number of the block obtained after serial-to-parallel conversion, and T is the length of the block.

Suppose the downlink channel information required by user u to upload can be expressed as:

$$h_u = [h_{u1} \, h_{u2} \ldots h_{uK}]$$

where $h_{uk}$ is Kth scalar downlink channel information associated with the user.

When the mobile user makes use of single-antenna for transmission and reception, K=M, and M is the number of antennas of the base station. Whereas when the mobile terminal makes use of multi-antennas, K=aM. The selection of value a is related to the space-time coding mode: when space division multiplexing is used, a=1, and when space-time coding is used, a=N, where N is the number of antennas of the mobile terminal.

The downlink channel information $h_u$ of user u is performed with spectrum spreading to obtain a spectrum-spread signal having a length of T:

$$\tilde{h}_u = h_u P_u^T \quad (2)$$

where $P_u = [p_{u1} \, p_{u2} \ldots p_{uK}]$ indicates T×K dimension spectrum-spreading matrix, each column vector $P_{uk}$ indicates a Walsh spectrum-spreading code having a length of T, and satisfies $p_j^T p_k = T\delta(j-k)$, $\tilde{h}$ indicates the downlink channel information performed with spectrum spreading, and $(\cdot)^T$ indicates transposition. In this case, the spectrum-spreading gain T is generally selected as even times of power of 2. The Walsh code can be realized with the help of Hadamard conversion, namely:

$$W_1 = [0]; \quad W_{2n} = \begin{bmatrix} W_n & W_n \\ W_n & \overline{W_n} \end{bmatrix} \quad (3)$$

The Walsh code generated by Equation (3) constitutes a set of complete orthogonal basis on the T dimension space. The T×K dimension spectrum-spreading matrix assigned to each user is from one certain K column in Equation (3), and Walsh codes assigned to different users are different from each other.

The signal actually transmitted by user u can be expressed as follows:

$$X_u(i) = \sqrt{(1-\rho)E} \, S_u(i) + \sqrt{\frac{\rho E}{K}} \, h_u P_u^T \quad (4)$$

where $X_u(i)$ indicates the signal actually transmitted, $\rho$ indicates the percentage of the downlink channel information in the power of the total transmission signal, and E indicates the total transmit power. The transmit power of each symbol period can be verified as E, namely, $$E[X_u(i) X_u^H(i)] = (1-\rho) E E[S_u(i) S_u^H(i)] + \frac{\rho E}{K} E[h_u P_u^T P_u h_u^H] \quad (5)$$
$$= (1-\rho) TE + \rho TE$$
$$= TE$$

where $(\cdot)^H$ indicates conjugate transposition.

Figure 3:
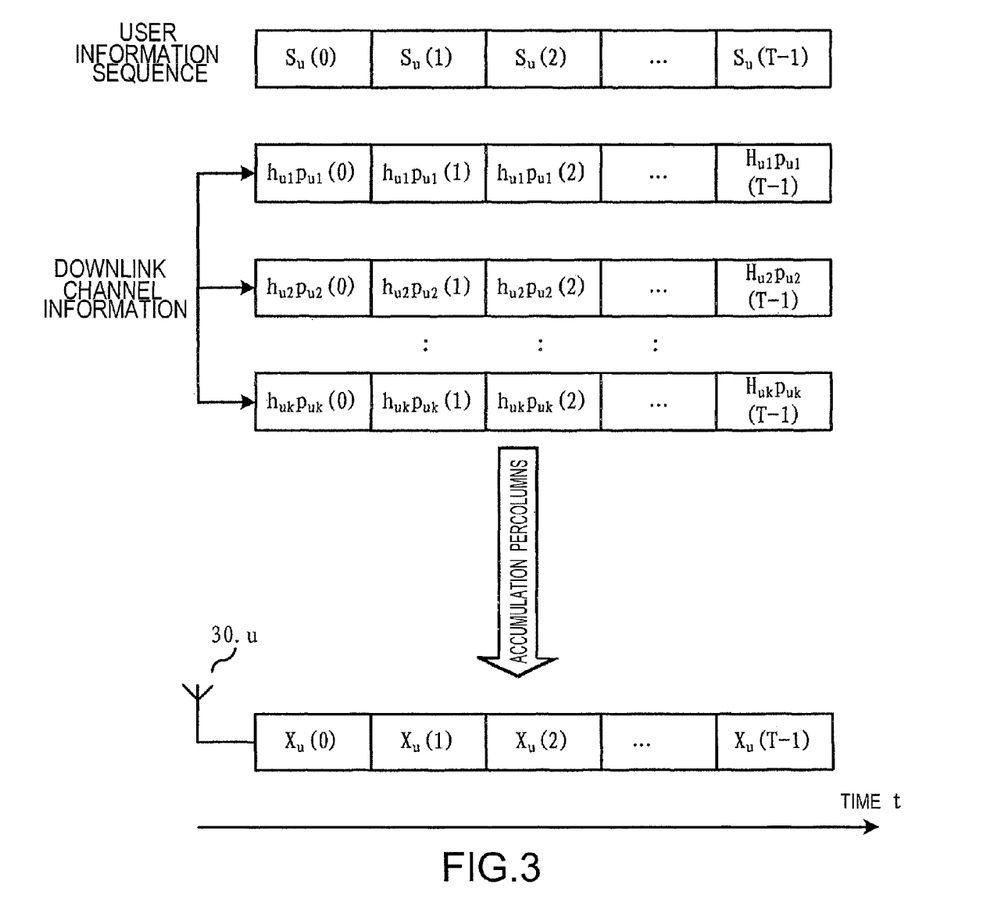
FIG. 3 is a schematic structural view showing data frames uploaded by the $u^{th}$ user according to an embodiment of the present invention.

FIG. 3 illustrates a structure showing data frames uploaded by the $u^{th}$ user. As can be known by referring to FIG. 3, in addition to his own T information symbols, user u further uploads K pieces of downlink channel information in T symbol periods.

Suppose K pieces of downlink channel information (the number may also be different) is uploaded by each user, and are transmitted synchronously with the same power, data block received by the base station antenna array in T symbol periods is as follows:

$$Y(i) = \sum_{u=1}^{U} g_u X_u(i) + V(i) \quad (6)$$

where $g_u$ and $X_u(i)$ are respectively M×1 dimension uplink channel vector and uploaded data corresponding to the $u^{th}$ user, V(i) is M×T dimension additive Gaussian white noise, whose elements satisfy i.i.d. with their means are all zero and variance is $\sigma_n^2$.

Figure 4:
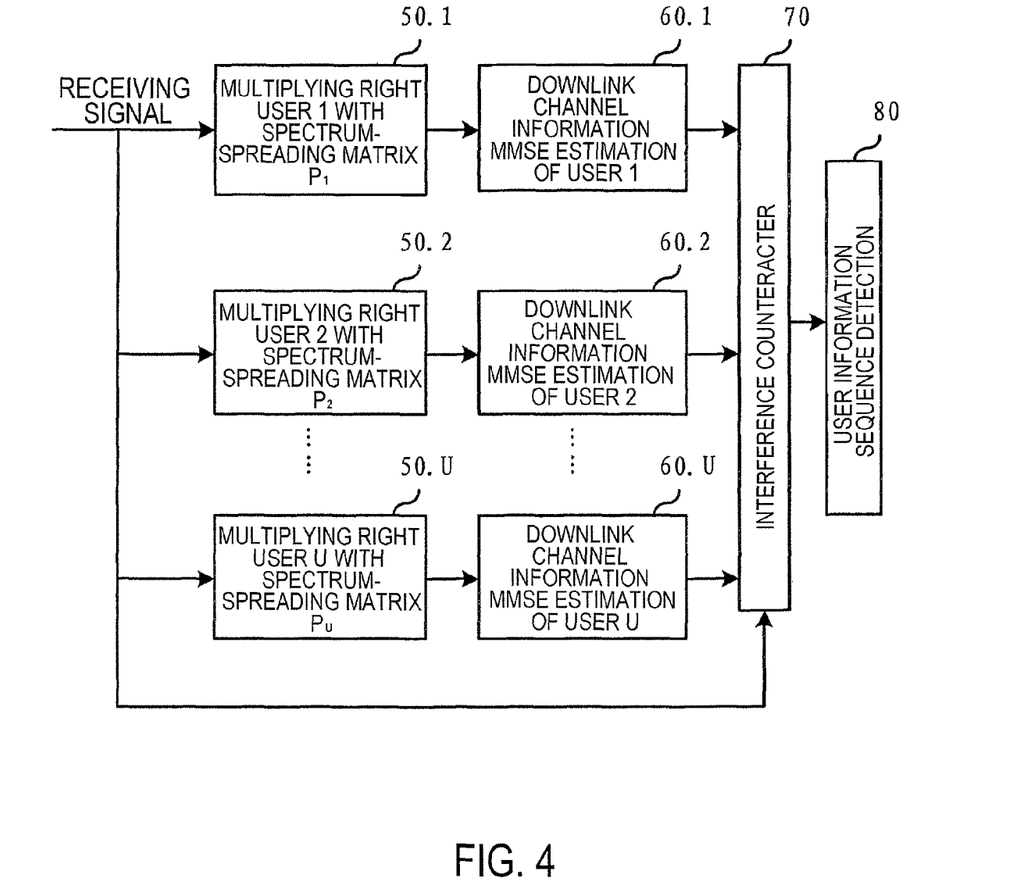
FIG. 4 is a functional block diagram showing uplink signal processing in a multi-user wireless communications system according to an embodiment of the present invention.

Refer to FIG. 4 for detailed explanation of recovery of each user information sequence and downlink channel information at the base station side. With respect to user u, de-spread is first preformed by using the spectrum-spreading matrix of this user (block 50.u as illustrated in FIG. 4) to obtain an estimated intermediate amount $\tilde{Y}_u(i)$ of the downlink channel information of the user, namely:

$$\tilde{Y}_u(i) = Y(i) P_u / T = \frac{1}{T} \sum_{v=1}^{U} g_v X_v(i) P_u + \frac{1}{T} V(i) P_u \quad (7)$$
$$= \frac{1}{T} \sqrt{(1-\rho)E} \sum_{v=1}^{U} g_v S_v(i) P_u + \sqrt{\frac{\rho E}{K}} g_u h_u + \frac{1}{T} V(i) P_u$$

Subsequently, estimation of minimum mean square error is performed by using the obtained intermediate amount $\tilde{Y}_u(i)$ to obtain the initial estimated value of the downlink channel information of the user (block 60.u as illustrated in FIG. 4):

$$\hat{h}_u = T\sqrt{\rho K E} \, g_u^H \left[ K(1-\rho) E \sum_{i=1}^{U} g_i g_i^H + T\rho E g_u g_u^H + K\sigma_n^2 I_M \right]^{-1} \tilde{Y}_u(i), \quad (8)$$
$$u = 1, \ldots, U$$

After the initial estimated values of the downlink channel information of all U users are obtained, their contributions are eliminated from the received signal in an interference counteracter 70, $$Y_{us}(i) = Y(i) - \sqrt{\frac{\rho E}{K}} \sum_{u=1}^{U} g_u \hat{h}_u P_u^T(i) \qquad (9)$$

$$= \sqrt{(1-\rho)E} \sum_{u=1}^{U} g_u S_u(i) +$$

$$\sqrt{\frac{\rho E}{K}} \sum_{u=1}^{U} g_u (h_u - \hat{h}_u) P_u^T(i) + V(i)$$

From the result of Equation (9), the information sequence of each user is detected by using a multi-user information sequence detector 80 to obtain the initial estimated value $\hat{S}_u(i)$, u=1, . . . , U of each user information sequence. Detection of information sequences usually employs the BLAST algorithm. For the BLAST algorithm, refer to the document by G. J. Foschini, "Layered Space-Time Architecture for Wireless Communication in a Fading Environment When Using Multiple Antennas," Bell Labs Technical Journal, Vol. 1, No. 2, pp 41-59, Autumn 1996, and the document by G. D. Golden, G. J. Foschini, R. A. Valenzuela, P. W. Wolniansky, "Detection Algorithm and Initial Laboratory Results using the V-BLAST Space-Time Communication Architecture," Electronics Letters, Vol. 35, No. 1, pp. 14-15, Jan. 7, 1999.

Figure 5:
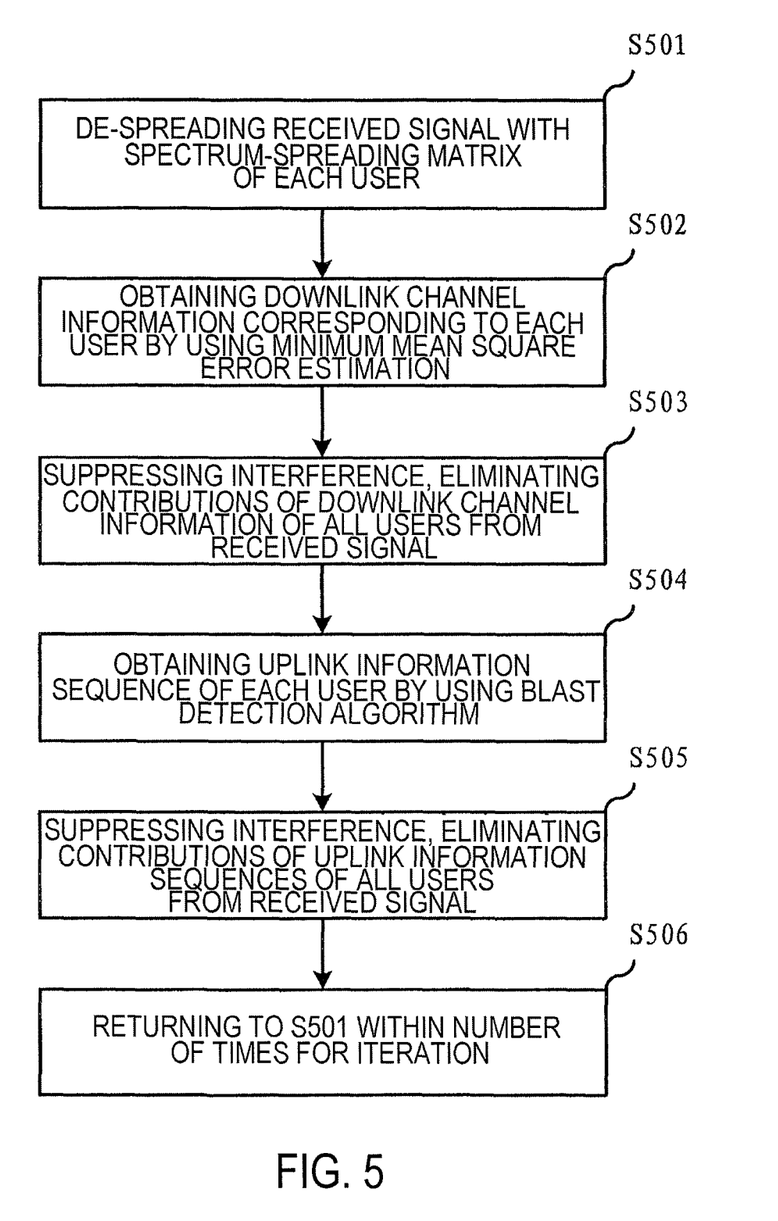
FIG. 5 is a flowchart showing uplink signal processing at a base station side in a multi-user wireless communications system according to an embodiment of the present invention.

In order to enhance estimation precision, detection of the user information sequence and estimation of the downlink channel information can be performed by iteration. FIG. 5 is a flowchart showing uplink signal processing at a base station side in a multi-user wireless communications system according to an embodiment of the present invention. Steps S501-S504 respectively correspond to functional blocks 50-80 in FIG. 4. Step S505 takes the estimated value of the user information sequence obtained in Step S504 as authentic value and eliminates the contribution of each user information sequence from the received signal, namely, $$Y_{csi}(i) = Y(i) - \sqrt{(1-\rho)E} \sum_{u=1}^{U} g_u \hat{S}_u(i) \qquad (10)$$

$$= \sqrt{(1-\rho)E} \sum_{u=1}^{U} g_u [S_u(i) - \hat{S}_u(i)] +$$

$$\sqrt{\frac{\rho E}{K}} \sum_{u=1}^{U} g_u h_u P_u^T(i) + V(i)$$

Because detection error rate of the user information sequence is relatively low, it can hence be considered as $\hat{S}_u(i)=S_u(i)$. Therefore, Equation (10) can be further written as:

$$Y_{csi}(i) = \sqrt{\frac{\rho E}{K}} \sum_{u=1}^{U} g_u h_u P_u^T(i) + V(i) \qquad (11)$$

Subsequently, output from Step S505 as illustrated in Equation (11) is taken as input in Step S501 to perform iterative estimation. At this time, estimation of the multi-user downlink channel can be regarded as a detection question in a multi-user spectrum-spread communications system, as the difference is the fact that the currently uploaded downlink channel information is analogous signal rather than digital signal.

Iterative estimation of the downlink channel information is similar to the methods of uplink user information sequence detection and the corresponding initial value estimation, and the only difference rests in the expression of the minimum mean square error estimation of the downlink channel information of each user. As can be seen from Equation (6) and Equation (11), due to the effect of interference cancellation, input in Step S501 after iteration can be regarded as free from interference from the user information sequence, so the iterated minimum mean square error estimation of the downlink channel information is:

$$\hat{h}_u = T\sqrt{\rho K}[T\rho g_u^H g_u + K\sigma_n^2]^{-1} g_u^H \tilde{Y}_u(i), u=1, \ldots, U \qquad (12)$$

where output from Step S501 after iteration is $$\tilde{Y}_u(i) = Y_{csi}(i) P_u / T = \sqrt{\frac{\rho E}{K}} g_u h_u + \frac{1}{T} V(i) P_u.$$

As many simulation results have shown, convergence is substantially possible by performing iteration only once. Therefore, iteration can be carried out only once in practical operation, so as to reduce computational amount while enhancing processing speed at the same time.

Currently available methods for feeding back channel information, such as vector-quantizing plus coding and direct channel information feedback (DCFB) etc., separately occupy uplink system resources, and are therefore with considerable cost in feedback. In the embodiments of the present invention, the downlink channel information and user information sequence are superposed before transmission, whereby system resources are not separately occupied, and spectrum utilization ratio of the system is much higher. Because estimation precision of the downlink channel information can be adjusted through power assignment, flexibility of the system is better than those of conventional art methods.

Although the present invention has been graphically illustrated and described with reference to certain preferred embodiments of the present invention, it should be known to persons ordinarily skilled in the art that various modifications could be made to these embodiments both in form and in details without departing from the spirits and scopes of the present invention.

What is claimed is:

1. A method for feeding back downlink channel information, comprising:
    spreading, by a wireless terminal, spectrum of the downlink channel information; and
    transmitting to a network side the spectrum-spread downlink channel information after having been superposed to a user information sequence of the wireless terminal, or transmitting to the network side the spectrum-spread downlink channel information through wireless resource used by another wireless terminal to transmit its user information sequences,
    wherein further comprising:
    before superposing the spectrum-spread downlink channel information to the user information sequence of the wireless terminal, converting the user information into a parallel signal having a width equal to a spectrum-spread code length used in spreading the spectrum; and
    after the superposition is completed, converting the parallel signal into a serial signal.

2. The method according to claim 1, wherein an orthogonal code is used to spread the spectrum of the downlink channel information.

3. The method according to claim 1, further comprising:
a lower limit of power ratio is determined according to a requirement on bit error rate during receiving at the network side; and that
when the superposition is performed, ratio of power of the spectrum-spread downlink channel information in a total power after superposition is larger than the lower limit of power ratio.

4. The method according to claim 1, wherein the wireless terminal uses at least one transmission antenna, and that, when the wireless terminal uses more than one antenna, transmission is performed in form of space division multiplexing or space-time block coding.

5. The method according to claim 1, wherein the wireless terminal uses orthogonal frequency division multiplexing technique to perform superposition and transmission of the user information sequence and the downlink channel information on each orthogonal frequency division multiplexed subcarrier.

6. A wireless terminal, comprising:
a unit adapted to spread spectrum of downlink channel information;
a unit adapted to superpose the spectrum-spread downlink channel information to a user information sequence; and
a unit adapted to transmit the superposed spectrum-spread signal to a network side, wherein further comprising:
a unit adapted to, before superposing the spectrum-spread downlink channel information to the user information sequence, convert the user information into a parallel signal, wherein the parallel signal has a width equal to a spectrum-spreading code length used in spreading the spectrum; and
a unit adapted to, after the superposition is completed, convert the parallel signal into a serial signal.

7. The wireless terminal according to claim 6, wherein the wireless terminal comprises at least one transmission antenna, and that, when the wireless terminal uses more than one antenna, transmission is performed in form of space division multiplexing or space-time block coding.

* * * * *